Aug. 16, 1938.  A. L. FREEDLANDER  2,127,397

STRAINER

Filed March 8, 1937

Inventor
ABRAHAM L. FREEDLANDER,
BY

Attorneys

Patented Aug. 16, 1938

2,127,397

UNITED STATES PATENT OFFICE 2,127,397

STRAINER

Abraham L. Freedlander, Dayton, Ohio, assignor to The Dayton Rubber Manufacturing Company, Dayton, Ohio, a corporation of Ohio Application March 8, 1937, Serial No. 129,628

5 Claims. (Cl. 210—164)

This invention relates to strainers and to combined strainers and gaskets.

It is an object of this invention to provide a combined strainer and gasket in which the gasket, in addition to performing its normal function, also performs the function of supporting the strainer, of locating the strainer and providing a resilient support therefor, whereby to relieve the strainer from wear and damage due to the striking thereagainst of particles sought to be prevented from flowing therethrough.

It is a further object of this invention to provide an integral structure having the properties and advantages of a strainer and the properties and advantages of a resilient gasket.

It is a further object of this invention to provide such a structure which comprises a strainer member of metal mesh provided with a resilient annulus integrally secured thereto.

It is a further object of this invention to provide such a metal mesh strainer member particularly adapted for use with pipe filler caps wherein the resilient annulus is provided with suction cup means whereby to secure it to the base portion of the filler cap so that the cap portion thereof may be freely removed therefrom without removal of or displacement of the screen.

It is a further object of this invention to provide such strainer structures which are particularly adapted for use in conduits for oil and/or gasoline.

It is a particular object of this invention to provide such strainer means for use in the suction pipe of gasoline tanks whereby to make it unnecessary to use expensive foot valve constructions at the lower end of such suction pipes.

It is a further object of this invention to provide such combined strainer and gasket means provided with suction cup means for use with the fill pipe cap on the fill pipe of storage tanks for gasoline, fuel oil, lubricating oil or the like.

It is a further object to provide such a combined strainer and gasket structure which is adapted for use between the threaded end portion of hose nozzles and the hose to which attached.

It is a further object of this invention to provide means for integrally securing an annular gasket member to a non-circular strainer member of metal screen mesh.

These and other objects and advantages will appear from the following description taken in connection with the drawing.

Figure 1:
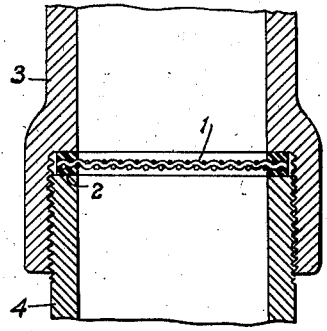
Figure 1 is an elevational view, in section, of a combined strainer and gasket construction as placed in a particular metallic pipe connection.

Referring to the drawing in detail, the strainer 10 illustrated in Figure 1 comprises a circular member 1 of screen mesh having the resilient annulus 2 of rubber, synthetic rubber or the like, integrally secured to the edge portions thereof. The resilient material of the annulus 2 is preferably vulcanized to the adjacent portions of the screen mesh 1, whereby to form an integral structure.

Figure 2:
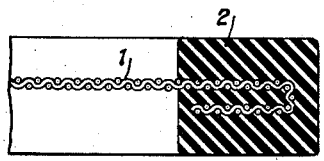
Figure 2 is an enlarged fragmentary view, in section, of a combined strainer and gasket similar to that illustrated in Figure 1, but showing a modified means of attachment of the resilient annulus to the screen.
Figure 3:
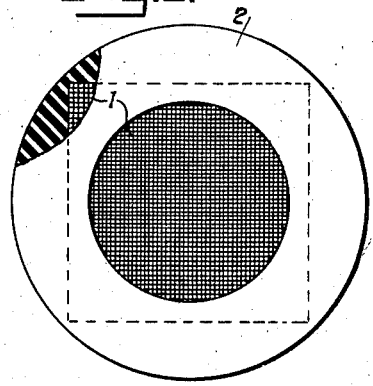
Figure 3 is a plan view, partly in section, of the construction illustrated in Figure 2.

As shown in Figures 2 and 3, the mesh 1 may be of rectangular or other non-circular form and the edges thereof may be bent over upon themselves in order to increase the area of contact between the resilient material of the annulus 2 and the mesh 1. The mesh 1 may be of rectangular or other non-circular form and the edge portions of the mesh may remain flat, as in Figure 1. In Figure 1, the conduit member 3 may be the nozzle of a gasoline hose and the member 4 may be the metallic connection on the gasoline hose. The member 3 may likewise be a section of the suction pipe leading from a pump to a storage tank for gasoline, oil or the like, and the member 4 may be an adjacent section of said pipe. Likewise, the member 3 may be one section and the member 4 may be the other section of a fill pipe leading to such tank. Insertion of such a screen member in the pipes or hose connections obviates the necessity for the provision of elaborate and expensive fittings such as foot valves on suction pipes and elaborate screen structures on fill pipes; while, where such screen members are provided at the connection between a gasoline hose nozzle and the hose, the screen prevents small particles of material from the hose wall from being carried through the hose nozzle as well as preventing the delivery to the hose nozzle of sediment and/or other foreign matter.

It is, of course, to be understood that the screen mesh 1 may be formed of any suitable material such as brass, copper, Monel metal or the like, the choice of metal depending upon the fluids to which it is to be exposed. Likewise, where the combined strainer and gasket is to be used with fluids which readily attack and destroy rubber, it is comprehended that materials having the required and desirable resiliency of rubber and, in addition, increased resistance to the attack of fluids to which exposed, may be used instead of rubber. These materials are preferably synthetic rubber or the like.

The resilient annulus 2, in addition to performing the function of making the joint between the conduit sections 3 and 4 fluid tight, also resiliently supports the screen 1; and, in addition, resiliently insulates the mesh 1 from the metal conduit sections 3 and 4, whereby to prevent crushing of the edge portions of the mesh and to prevent friction between these edge portions and adjacent portions of the sections 3 and 4, due to bending of the mesh 1 due to the passage therethrough of pulsating fluids. Likewise, such friction will be prevented upon the occurrence of instantaneous shock imparted to the mesh due to the striking thereagainst of solid matter in the fluids.

The showing of the mesh in Figures 1 to 3 inclusive is diagrammatic and it is, of course, to be understood that the fineness or gauge of the mesh will be particularly chosen for the relation for which the strainer is adapted and the fluids adapted to be strained thereby. The mesh strainer member may be planar, as illustrated in Figure 1. The screen member of this construction may, of course, be flat or planar, as in the construction illustrated in Figures 1, 2 and 3.

It will be understood that the above described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. An article of manufacture for use as a combined screen and gasket comprising a metal mesh member having an annulus secured to its edges, said annulus being formed of oil resistant synthetic rubber.

2. An article of manufacture for use as a combined screen and gasket comprising a non-circular metal mesh member having its edges imbedded in an annulus of oil and gasoline resistant synthetic rubber vulcanized to the mesh.

3. A new article of manufacture for use as a combined screen and gasket comprising a rectangular sheet of metallic screen mesh having opposite edges bent over upon themselves and a resilient annulus having the edge portions of said mesh imbedded therein.

4. A new article of manufacture for use as a combined screen and gasket comprising a rectangular sheet of metallic screen mesh having opposite edges bent over upon themselves and a resilient annulus of oil resistant synthetic rubber having the edge portions of said mesh imbedded therein.

5. Supporting means for a metal mesh screen member comprising an annulus of oil and gasoline resistant synthetic rubber having the edges of the screen member imbedded therein and vulcanized thereto.

ABRAHAM L. FREEDLANDER.